(12) United States Patent
Ou et al.

(10) Patent No.: US 10,187,834 B2
(45) Date of Patent: Jan. 22, 2019

(54) METHOD FOR HANDOVER BETWEEN DISTRIBUTED APS, CENTRAL AP, AND DISTRIBUTED AP

(71) Applicant: Huawei Technologies Co., Ltd., Shenzhen (CN)

(72) Inventors: Liyun Ou, Nanjing (CN); Yungui Wang, Nanjing (CN); Lin Zhang, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 15/474,465

(22) Filed: Mar. 30, 2017

(65) Prior Publication Data
US 2017/0289878 A1 Oct. 5, 2017

(30) Foreign Application Priority Data
Mar. 30, 2016 (CN) .......................... 2016 1 0192314

(51) Int. Cl.
*H04W 36/08* (2009.01)
*H04W 36/00* (2009.01)
(Continued)

(52) U.S. Cl.
CPC .......... *H04W 36/08* (2013.01); *H04L 1/1848* (2013.01); *H04L 1/1854* (2013.01);
(Continued)

(58) Field of Classification Search
None
See application file for complete search history.

(56) References Cited

U.S. PATENT DOCUMENTS 6,580,713 B1 * 6/2003 Abe ...................... H04L 1/0083
370/394
2002/0045451 A1 * 4/2002 Hwang ............. H04W 36/0072
455/442

(Continued)

FOREIGN PATENT DOCUMENTS

EP          1802029 A1    6/2007
EP          2068591 A2    6/2009
(Continued)

OTHER PUBLICATIONS

"Part 11: Wireless LAN Medium Access Control (MAC) and Physical Layer (PHY) Specifications, Amendment 2: Fast Basic Service Set (BSS)Transition," IEEE Jul. 15, 2008, 126 pages.

(Continued)

*Primary Examiner* — Lonnie V Sweet
(74) *Attorney, Agent, or Firm* — Conley Rose, P.C.

(57) ABSTRACT

A method for handover between distributed access points (APs), where the method includes a central AP sending a first instruction to an AP 2. The first instruction includes an identifier of the wireless terminal, and the first instruction is used to instruct the AP 2 to start receiving a data frame from the wireless terminal, and forbid the AP 2 to return an acknowledgement frame to the wireless terminal. The central AP sends a handover success notification message to an AP 1 and the AP 2. The handover success notification message includes the identifier of the wireless terminal, and the handover success notification message is used to instruct the AP 1 to stop receiving the data frame from the wireless terminal, and is used to instruct the AP 2 to return the acknowledgement frame to the wireless terminal.

24 Claims, 5 Drawing Sheets

(51) Int. Cl.
*H04W 84/12* (2009.01)
*H04W 88/12* (2009.01)
*H04L 1/18* (2006.01)
*H04L 5/00* (2006.01)
*H04L 12/741* (2013.01)
*H04L 12/801* (2013.01)

(52) U.S. Cl.
CPC ............ *H04L 5/0055* (2013.01); *H04L 45/74* (2013.01); *H04L 47/34* (2013.01); *H04W 36/0011* (2013.01); *H04W 36/0016* (2013.01); *H04W 36/0061* (2013.01); *H04W 84/12* (2013.01); *H04W 88/12* (2013.01)

(56) References Cited

U.S. PATENT DOCUMENTS

| | | | |
|---|---|---|---|
| 2004/0023693 A1* | 2/2004 | Okawa | H04W 36/12 455/562.1 |
| 2004/0160925 A1* | 8/2004 | Heo | H04L 1/1845 370/335 |
| 2004/0246917 A1 | 12/2004 | Cheng et al. | |
| 2006/0215594 A1 | 9/2006 | Shirokura et al. | |
| 2006/0240830 A1* | 10/2006 | Ranta-Aho | H04W 36/0055 455/436 |
| 2007/0049279 A1* | 3/2007 | Van Rensburg | H04W 36/18 455/442 |
| 2008/0233963 A1* | 9/2008 | Alanara | H04W 12/06 455/438 |
| 2009/0193310 A1* | 7/2009 | Hashimoto | H04L 1/1642 714/749 |
| 2010/0215020 A1* | 8/2010 | Lee | H04L 1/1614 370/331 |
| 2010/0323749 A1 | 12/2010 | Lee et al. | |
| 2011/0090794 A1 | 4/2011 | Cherian et al. | |
| 2011/0294509 A1* | 12/2011 | Kim | H04W 36/24 455/436 |
| 2013/0259002 A1 | 10/2013 | Zhang et al. | |
| 2014/0050180 A1* | 2/2014 | Kimura | H04L 5/0037 370/329 |
| 2015/0181493 A1* | 6/2015 | Park | H04W 36/24 455/436 |
| 2016/0135103 A1* | 5/2016 | Lee | H04W 28/08 455/444 |

FOREIGN PATENT DOCUMENTS

| | | |
|---|---|---|
| EP | 2699051 A1 | 2/2014 |
| JP | 2007511135 A | 4/2007 |
| JP | 2012524460 A | 10/2012 |
| WO | 2006001072 A1 | 1/2006 |

OTHER PUBLICATIONS

Foreign Communication From a Counterpart Application, European Application No. 17163649.1, Extended European Search Report dated Aug. 1, 2017, 8 pages.

Foreign Communication From a Counterpart Application, Japanese Application No. 2017-064782, Japanese Notice of Allowance dated Jul. 3, 2018, 3 pages.

* cited by examiner

METHOD FOR HANDOVER BETWEEN DISTRIBUTED APS, CENTRAL AP, AND DISTRIBUTED AP

CROSS-REFERENCE TO RELATED APPLICATION

This application claims priority to Chinese Patent Application No. 201610192314.5, filed on Mar. 30, 2016, which is hereby incorporated by reference in its entirety.

TECHNICAL FIELD

This application relates to the field of communications technologies, and in particular, to a method for handover between distributed access points (APs), a central AP, and a distributed AP.

BACKGROUND

A wireless local area network (WLAN) generally has a coverage radius of 20 meters (m) to 30 m indoors and a coverage radius of 100 m outdoors. When a wireless terminal moves, it is inevitably handed over between APs. That is, when the wireless terminal moves from a coverage area of one AP to a coverage area of another AP, the wireless terminal is switched from a state of being connected to the former AP to a state of being connected to the latter AP. In the handover process of the wireless terminal, the wireless terminal temporarily disconnects from a wireless network, and in this case, a packet forwarded on the network may be lost. If the lost packet is a voice service packet, a short-time voice loss occurs. If the lost packet is a video service packet, a freeze and artifacts occur for a short time. This degrades user experience.

SUMMARY

An objective of this application is to provide an improved handover method.

A first aspect provides a method for handover between different distributed APs in a same mobile domain (that is, in which a same central AP implements control). The central AP makes a handover decision on a wireless terminal, and when the wireless terminal meets a handover condition, determines that the wireless terminal is handed over from a first distributed AP to a second distributed AP, and sends a first instruction to the second distributed AP. The first instruction includes an identifier of the wireless terminal, such as a media access control (MAC) address of the wireless terminal. When receiving the first instruction, the second distributed AP starts receiving a data frame from the wireless terminal and skips returning an acknowledgement frame to the wireless terminal. The central AP sends a handover success notification message to the first distributed AP and the second distributed AP. When receiving the handover success notification message, the second distributed AP returns the acknowledgement frame to the wireless terminal. When receiving the handover success notification message, the first distributed AP stops receiving the data frame from the wireless terminal.

In the technical solution, in a process in which a wireless terminal moves from a coverage area of a first distributed AP to a coverage area of a second distributed AP, the first distributed AP first receives, in a receiving mode (that is, an acknowledgement frame is returned when a data frame is received from the wireless terminal), a data frame from the wireless terminal, and switches from the receiving mode to a listening mode (that is, no acknowledgement frame is returned when a data frame is received from the wireless terminal) only when receiving a handover success notification message. The second distributed AP first receives, in the listening mode, the data frame from the wireless terminal, and switches from the listening mode to the receiving mode only when receiving a handover success notification message. In a handover process, both the distributed AP before the handover and the distributed AP after the handover receive the data frame from the wireless terminal, ensuring that no data frame sent by the wireless terminal during the handover between the first distributed AP and the second distributed AP is lost, and avoiding service interruption. In addition, only one of multiple distributed APs that simultaneously receive the data frame from the wireless terminal returns an acknowledgement frame, avoiding a collision among multiple acknowledgement frames.

In a first possible implementation manner of the first aspect, the handover success notification message is used to immediately forbid the first distributed AP to return an acknowledgement frame the wireless terminal, and stop receiving the data frame from the wireless terminal after preset duration.

In a second possible implementation manner of the first aspect, the handover success notification message is used to instruct the first distributed AP to immediately stop receiving the data frame from the wireless terminal.

With reference to the first aspect or either of the first or the second possible implementation manner of the first aspect, in a third possible implementation manner, when receiving a detection acknowledgement frame sent by the second distributed AP, the central AP sends the handover success notification message to the first distributed AP and the second distributed AP. The detection acknowledgement frame is used to indicate that the second distributed AP is capable of receiving the data frame from the wireless terminal.

In the technical solution, an amount of computation of the central AP is reduced by triggering, using a detection acknowledgement frame sent by the distributed AP, the central AP to send a handover success notification message.

With reference to the first aspect or either of the first or the second possible implementation manner of the first aspect, in a fourth possible implementation manner, when determining for the $N^{th}$ time that an Ethernet frame of the wireless terminal sent by the first distributed AP or the second distributed AP is a duplicate Ethernet frame, the central AP sends the handover success notification message to the first distributed AP and the second distributed AP, where $N \geq 1$.

In the technical solution, the central AP determines, according to a duplicate Ethernet frame, whether the wireless terminal has been handed over to the second distributed AP, so as to quickly perceive a handover success.

With reference to the first aspect or either of the first or the second possible implementation manner of the first aspect, in a fifth possible implementation manner, when receiving a detection acknowledgement frame sent by the second distributed AP and determining for the $N^{th}$ time that an Ethernet frame of the wireless terminal sent by the first distributed AP or the second distributed AP is a duplicate Ethernet frame, the central AP sends the handover success notification message to the first distributed AP and the second distributed AP.

With reference to any one of the first aspect, or the first to the fifth possible implementation manners of the first aspect, in a sixth possible implementation manner, the first instruction is further used to instruct the second distributed AP to add, when converting the data frame sent by the wireless terminal into an Ethernet frame, a sequence number in the data frame to the Ethernet frame. The central AP may further send a second instruction to the first distributed AP, and according to the second instruction, the first distributed AP adds, when converting the data frame sent by the wireless terminal into an Ethernet frame, the sequence number in the data frame to the Ethernet frame. When receiving the Ethernet frame sent by the first distributed AP or the second distributed AP, the central AP extracts the sequence number in the Ethernet frame and a source address of the data frame corresponding to the Ethernet frame, and determines, according to the sequence number and the source address, whether the Ethernet frame is a duplicate Ethernet frame; and if the Ethernet frame is a duplicate Ethernet frame, the central AP discards the Ethernet frame; otherwise, the central AP records the sequence number according to the source address.

In the technical solution, the central AP discards duplicate Ethernet frames sent by the first distributed AP and the second distributed AP, improving network resource utilization.

With reference to the sixth possible implementation manner of the first aspect, in a seventh possible implementation manner, the central AP records sequence numbers of multiple Ethernet frames of the wireless terminal. If among the recorded sequence numbers of the multiple Ethernet frames of the wireless terminal, there is a sequence number the same as the sequence number in the Ethernet frame, the central AP determines that the Ethernet frame is a duplicate Ethernet frame.

In the technical solution, regardless of whether sequence numbers are generated in ascending order when the wireless terminal sends data frames, a duplicate Ethernet frame can be detected.

With reference to the sixth possible implementation manner of the first aspect, in an eighth possible implementation manner, the central AP records a maximum sequence number. If the sequence number of the Ethernet frame is less than or equal to the recorded maximum sequence number, the central AP determines that the Ethernet frame is a duplicate Ethernet frame. If the sequence number of the Ethernet frame is greater than the recorded maximum sequence number, the central AP changes the maximum sequence number to the sequence number of the Ethernet frame.

If sequence numbers are generated in ascending order when the wireless terminal sends data frames, the technical solution can be used to detect a duplicate Ethernet frame, and can reduce detection complexity, improve a detection speed, and save storage resources.

With reference to the sixth to the eighth possible implementation manners of the first aspect, in a ninth possible implementation manner, a location of the sequence number in the Ethernet frame includes either of the following: a virtual local area network identifier (VLAN ID) field in an Ethernet header of the Ethernet frame; or a customized field of a control and provisioning of wireless access points (CAPWAP) header of a CAPWAP packet carried in the Ethernet frame.

With reference to any one of the first to the ninth possible implementation manners of the first aspect, in a tenth possible implementation manner, after sending the first instruction to the second distributed AP, the central AP enables a duplicate-frame detection function. After enabling the duplicate-frame detection function, the central AP may discard duplicate Ethernet frames sent by the first distributed AP and the second distributed AP. For how the central AP determines whether the Ethernet frames sent by the first distributed AP and the second distributed AP are duplicate Ethernet frames, refer to descriptions of any one of the sixth to the ninth possible implementation manners of the first aspect, and details are not further described herein.

With reference to any one of the first to the tenth possible implementation manners of the first aspect, in an eleventh possible implementation manner, the central AP automatically enables the duplicate-frame detection function during initialization, so as to avoid frequent switching between enabling and disabling of the duplicate-frame detection function.

With reference to either of the tenth or the eleventh possible implementation manner of the first aspect, in a twelfth possible implementation manner, after sending the handover success notification message to the first distributed AP and the second distributed AP, the central AP may further detect whether no wireless terminal is handed over between the distributed APs currently; and if yes, the central AP disables the duplicate-frame detection function after a preset time interval since a moment the handover success notification message is sent, so as to reduce power consumption of the central AP.

A second aspect provides another method for handover between different distributed APs in a same mobile domain. A distributed AP receives a first instruction sent by a central AP, and the first instruction includes an identifier of a wireless terminal. In response to the first instruction, the distributed AP starts receiving a data frame from the wireless terminal and skips returning an acknowledgement frame to the wireless terminal. The distributed AP receives a first handover success notification message sent by the central AP, and the first handover success notification message includes the identifier of the wireless terminal. The distributed AP returns the acknowledgement frame to the wireless terminal in response to the first handover success notification message.

In a first possible implementation manner of the second aspect, before the distributed AP receives the first handover success notification message sent by the central AP, the distributed AP sends a detection acknowledgement frame to the central AP, and the detection acknowledgement frame is used to indicate that the distributed AP is capable of receiving the data frame from the wireless terminal.

With reference to the second aspect or the first possible implementation manner of the second aspect, in a second possible implementation manner, after the distributed AP returns the acknowledgement frame to the wireless terminal in response to the first handover success notification message, the distributed AP further receives a second handover success notification message sent by the central AP, and the second handover success notification message includes the identifier of the wireless terminal. The distributed AP stops receiving the data frame from the wireless terminal in response to the second handover success notification message.

With reference to the second possible implementation manner of the second aspect, in a third possible implementation manner, the distributed AP immediately stops returning the acknowledgement frame to the wireless terminal, and stops receiving the data frame from the wireless terminal after preset duration.

With reference to the second possible implementation manner of the second aspect, in a fourth possible implementation manner, the distributed AP immediately stops receiving the data frame from the wireless terminal.

With reference to the first to the fourth possible implementation manners of the second aspect, in a fifth possible implementation manner, the distributed AP may further convert the data frame sent by the wireless terminal into an Ethernet frame and add a sequence number in the data frame to the Ethernet frame. The distributed AP sends the Ethernet frame to the central AP.

With reference to the fifth possible implementation manner of the second aspect, in a sixth possible implementation manner, a location of the sequence number in the Ethernet frame includes either of the following: a VLAN ID field in an Ethernet header of the Ethernet frame; or a customized field of a CAPWAP header of a CAPWAP packet carried in the Ethernet frame.

A third aspect provides a central AP. The central AP includes a processor, a memory, and a network interface. The processor is connected to the memory and the network interface. For example, the processor may be connected to the memory and the network interface using a bus. The network interface is configured to be connected to a distributed AP in a wired manner, to send to and receive from the distributed AP messages involved in the foregoing method. The memory is configured to store a handover condition and a sequence number of a wireless terminal. The processor is configured to perform some or all of the process in the first aspect.

A fourth aspect provides another central AP. The central AP includes a processing module, a sending module, and a receiving module. The central AP implements some or all of the method in the first aspect using the foregoing modules.

A fifth aspect provides a computer storage medium is provided. The computer storage medium stores a program, and the program executes some or all steps in the first aspect.

A sixth aspect provides a distributed AP. The distributed AP includes a processor, a memory, and a network interface. The network interface includes a wired interface and a wireless interface. The distributed AP is connected to a central AP in a wired manner using the wired interface, to send to and receive from the central AP messages involved in the foregoing method. The distributed AP implements wireless communication with a wireless terminal using the wireless interface. The processor is configured to perform some or all of the process in the second aspect.

A seventh aspect provides another distributed AP. The distributed AP includes a processing module, a sending module, and a receiving module. The distributed AP implements some or all of the method in the second aspect using the foregoing modules.

An eighth aspect provides a computer storage medium. The computer storage medium stores a program, and the program executes some or all steps in the second aspect.

BRIEF DESCRIPTION OF THE DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DETAILED DESCRIPTION

Figure 1:
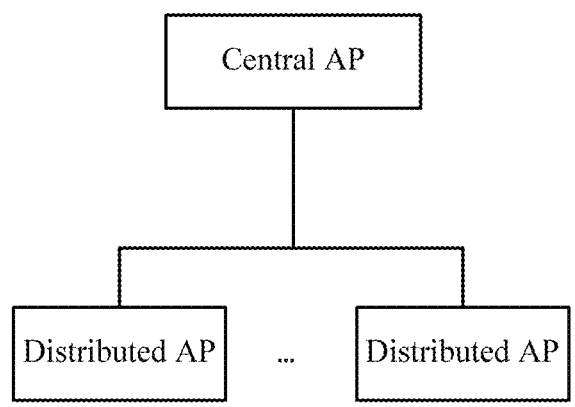
FIG. 1 is a schematic structural diagram of a central-distributed architecture according to an embodiment of the present disclosure.

As shown in FIG. 1, a central-distributed architecture includes a central AP and at least two distributed APs.

In some embodiments, the central AP has functions of a conventional AP (except a radio frequency part), and is added with some functions of a wireless controller, such as wireless terminal association control and intra-central AP handover. The central AP also has a function of managing a distributed AP. In addition to the foregoing functions, the central AP may further have a broadband service-related function and a service forwarding-related function of the conventional AP, such as a quality of service (QoS) function and an access control list (ACL) function. The wireless controller may be an Access Controller (AC) specified in the CAPWAP.

In some other embodiments, in addition to the foregoing functions, the central AP may further have gateway functions, such as network access control (NAC) and the Dynamic Host Configuration Protocol (DHCP).

The distributed AP is a remote radio module removed from the conventional AP, and is responsible for processing an air interface packet of a WLAN, and communicating with the central AP using a wired network (for example, the Ethernet). The central AP and the distributed AP may communicate with each other directly or using the CAPWAP protocol.

The CAPWAP control protocol provides a control channel between a Wireless Termination Point (WTP) and an AC. In this embodiment of the present disclosure, when the distributed AP and the central AP communicate with each other using a CAPWAP tunnel, the central AP acts as the AC in the CAPWAP control protocol, and the distributed AP acts as the WTP in the CAPWAP control protocol.

This embodiment of the present disclosure is applicable to a scenario in which a wireless terminal is handed over between different distributed APs controlled by a central AP. The handover refers to a process of moving from a currently associated distributed AP to another distributed AP.

The wireless terminal is any device with a WLAN station (STA) function, such as a cell phone, a smartphone, a computer, a tablet computer, a personal digital assistant (PDA), a mobile Internet device (MID), a wearable device, and an electronic book (e-book) reader.

Figure 2:
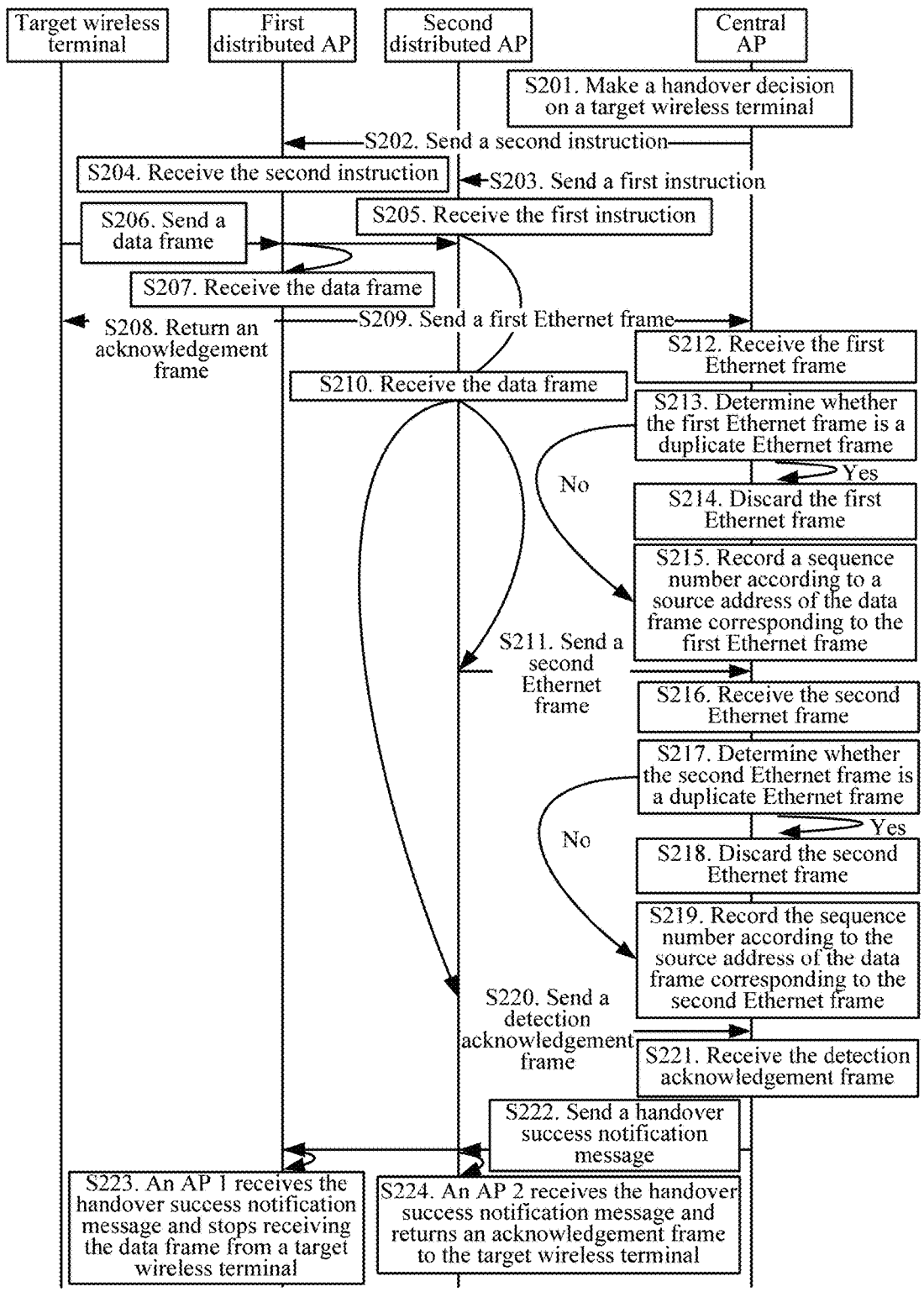
FIG. 2 is a schematic flowchart of a method for handover between distributed APs according to an embodiment of the present disclosure.

Referring to FIG. 2, FIG. 2 is a schematic flowchart of a method for handover between distributed APs according to an embodiment of the present disclosure. In a coverage area of a distributed AP controlled by a central AP, multiple wireless terminals may be handed over. Processes of handover of the wireless terminals between distributed APs are the same. Therefore, in this embodiment of the present disclosure, one of the wireless terminals, that is, a target wireless terminal, is used as an example for description. As shown in FIG. 2, the method includes the following steps.

S201. A central AP makes a handover decision on a target wireless terminal, and when the target wireless terminal meets a handover condition, determines that the target wireless terminal is handed over from a first distributed AP to a second distributed AP.

Figure 3:
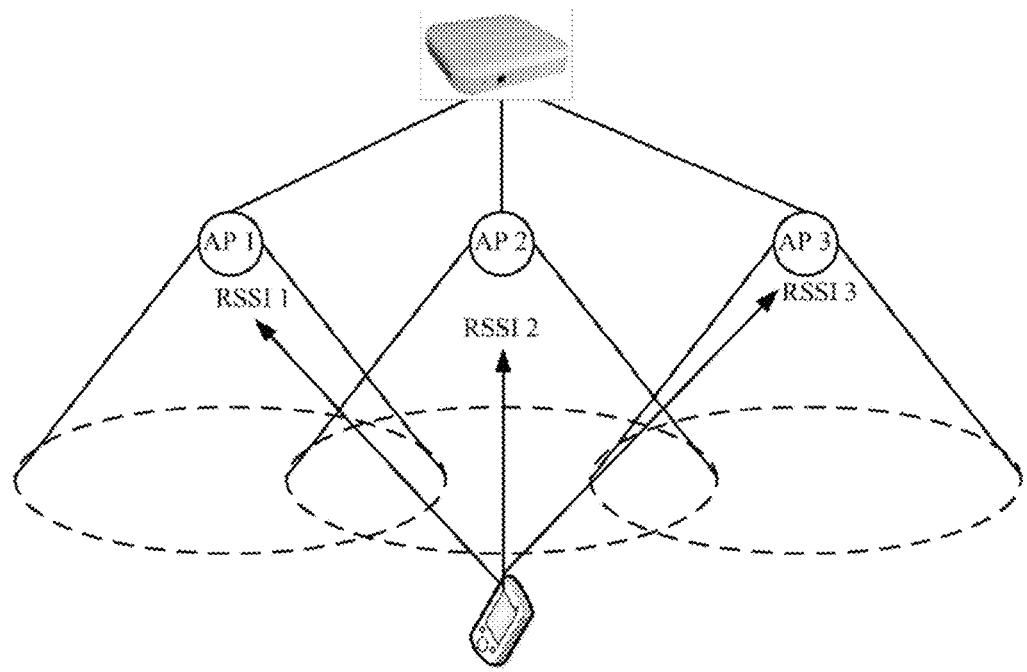
FIG. 3 is a schematic diagram of a handover scenario according to an embodiment of the present disclosure.

As shown in FIG. 3, after the target wireless terminal is connected to a network, both a currently associated distributed AP (for example, an AP 2 in FIG. 3) and its neighboring distributed APs (for example, an AP 1 and an AP 3 in FIG. 3) periodically report received signal strength indication (RSSI) of the target wireless terminal to the central AP. The central AP determines, based on the RSSIs of the target wireless terminal that are monitored by the distributed APs, whether the handover condition is met. If the handover condition is met, the central AP determines that the target wireless terminal is handed over from the first distributed AP to the second distributed AP, and performs step S202 and step S203.

In some embodiments, the central AP separately compares an RSSI sent by the distributed AP currently associated with the target wireless terminal with RSSIs sent by the neighboring distributed APs. If a difference between a strength of the RSSI sent by the neighboring distributed AP and a strength of the RSSI sent by the currently associated distributed AP reaches a given threshold, and in a subsequent period of time, the strength of the RSSI sent by the neighboring distributed AP is increasing while the strength of the RSSI sent by the currently associated distributed AP is getting smaller, the central AP determines that the handover condition is met. As shown in FIG. 3, it is assumed that an RSSI sent by the AP 2 is an RSSI 2, an RSSI sent by the AP 1 is an RSSI 1, and an RSSI sent by the AP 3 is an RSSI 3. If a difference obtained by subtracting the RSSI 2 from the RSSI 3 reaches a given threshold, and in a subsequent period of time, a strength of the RSSI 3 is increasing while a strength of the RSSI 2 is getting smaller, the central AP determines that a handover condition is met.

The handover condition may alternatively be another combination that can be used for a handover decision. For example, the strength of the RSSI sent by the neighboring distributed AP exceeds a given threshold, and the strength of the RSSI sent by the distributed AP currently associated with the target wireless terminal is less than a given threshold.

S202. The central AP sends a second instruction to the first distributed AP.

The first distributed AP (hereinafter referred to as the AP 1) is a distributed AP associated with the target wireless terminal before the handover. The second instruction includes a terminal identifier of the target wireless terminal, such as a MAC address of the target wireless terminal, and is used to inform the AP 1 that the target wireless terminal is to move out of a coverage area of the AP 1.

S203. The central AP sends a first instruction to the second distributed AP.

The second distributed AP (hereinafter referred to as the AP 2) is a distributed AP associated with the target wireless terminal after the handover. The first instruction includes the terminal identifier of the target wireless terminal, a corresponding virtual basic service set identifier (BSSID), a user key, and the like.

The central AP may generate multiple virtual BSSIDs. After the target wireless terminal is connected to any distributed AP controlled by the central AP, the central AP designates a virtual BSSID for the target wireless terminal.

The central AP may generate multiple virtual BSSIDs in advance, and designate one of the virtual BSSIDs for the target wireless terminal after the target wireless terminal is connected to any distributed AP. Alternatively, the central AP may not generate a virtual BSSID in advance, but generate a virtual BSSID after the target wireless terminal is connected to any distributed AP, and designate the virtual BSSID for the target wireless terminal. When the target wireless terminal is handed over within an area of the central AP (that is, an area of all distributed APs controlled by the central AP), the virtual BSSID remains unchanged. That is, when each distributed AP controlled by the central AP sends a WLAN frame to the target wireless terminal, the virtual BSSID is used to fill in a field that is in the WLAN frame and in which a MAC address of an AP needs to be filled, for example, a transmitter address field and a BSSID field. Therefore, when the target wireless terminal is in the area of the central AP, the target wireless terminal regards that it communicates with an AP whose BSSID is the virtual BSSID. The terminal identifier of the target wireless terminal is used to inform the AP 2 that the target wireless terminal is to move to a coverage area of the AP 2. The user key of the target wireless terminal is encryption and decryption related data that is used when the target wireless terminal communicates with the AP 1.

It should be noted that there is no strict order between S202 and S203 and they may alternatively be performed at the same time.

S204. The AP 1 receives the second instruction.

S205. The AP 2 receives the first instruction.

When receiving the first instruction, the AP 2 creates a context for the target wireless terminal. The context is used to record data associated with the target wireless terminal, such as the terminal identifier of the target wireless terminal and the corresponding virtual BSSID. If the first instruction further includes the user key of the target wireless terminal, when receiving the first instruction, the AP 2 further configures the user key on an encryption and decryption module of the AP 2.

S206. The target wireless terminal sends a data frame.

S207. The AP 1 receives the data frame sent by the target wireless terminal.

If the AP 1 does not receive the data frame sent by the target wireless terminal, this step is omitted.

S208. The AP 1 returns an acknowledgement frame to the target wireless terminal after receiving the data frame.

S209. The AP 1 converts the received data frame into a first Ethernet frame, adds a sequence number in the data frame to the first Ethernet frame, and sends the first Ethernet frame to the central AP.

The data frame includes a 16-bit sequence control bit. The sequence control bit includes a 4-bit fragment number bit and a 12-bit sequence number (SN) bit. After receiving the data frame sent by the target wireless terminal, the AP 1 extracts the sequence number of the data frame, encapsulates the sequence number into the first Ethernet frame, and sends the first Ethernet frame to the central AP.

A location of the sequence number in the first Ethernet frame includes either of the following manners.

Manner 1: The sequence number is in a VLAN ID field in a frame header of the first Ethernet frame. An Ethernet frame has a 12-bit VLAN ID field. In a central-distributed architecture, a central AP and a distributed AP are directly connected. The central AP may indicate, by means of setting, that Ethernet frames sent by all distributed APs directly connected to the central AP need to be received, and the VLAN ID field of the Ethernet frame does not need to include a VLAN ID of the distributed AP controlled by the central AP. Therefore, the VLAN ID field may include the sequence number of the target wireless terminal.

Manner 2: If the first Ethernet frame carries a CAPWAP packet, the sequence number may be in a customized field of a CAPWAP header of the CAPWAP packet carried in the first Ethernet frame. If the first Ethernet frame is encapsulated using the CAPWAP protocol, a field may be customized in the CAPWAP header, and the customized field includes the sequence number of the target wireless terminal.

It should be noted that the sequence number of the data frame may alternatively be in another location in the first Ethernet frame. Any manner in which the first Ethernet frame includes the sequence number of the data frame falls within the protection scope of the present disclosure. The above two manners are not intended to limit the present disclosure.

It should further be noted that there is no strict order between step S208 and step S209 and they may alternatively be performed at the same time.

S210. The AP 2 receives the data frame sent by the target wireless terminal.

After receiving the data frame sent by the target wireless terminal, the AP 2 does not return an acknowledgement frame to the target wireless terminal.

After the target wireless terminal sends a data frame, which distributed AP, the AP 1 or the AP 2, first receives the data frame is determined according to an actual situation. The order in the process is not intended to limit the present disclosure.

If the AP 1 or the AP 2 does not receive the data frame sent by the target wireless terminal, a corresponding step is omitted.

S211. The AP 2 converts the received data frame into a second Ethernet frame, adds the sequence number in the data frame to the second Ethernet frame, and sends the second Ethernet frame to the central AP.

It should be noted that, for a location of the sequence number in the second Ethernet frame, refer to the above description of the location of the sequence number in the first Ethernet frame, and details are not further described herein.

S212. The central AP receives the first Ethernet frame.

S213. The central AP determines whether the first Ethernet frame is a duplicate Ethernet frame; if yes, step S214 is performed; otherwise, step S215 is performed.

A manner of recording, by the central AP, the sequence number of the target wireless terminal includes either of the following manners.

Manner 1: The central AP records a maximum sequence number of the target wireless terminal.

Manner 2: The central AP records sequence numbers of multiple Ethernet frames of the target wireless terminal. The central AP may record sequence numbers of all Ethernet frames of the target wireless terminal that are received in a most recent period, such as the last 30 minutes, one hour, and two hours. That is, the central AP may specify to record sequence numbers of all Ethernet frames of the target wireless terminal that are received in a given period of time. The central AP may alternatively preset a quantity of to-be-recorded sequence numbers of the target wireless terminal. It is assumed that the preset quantity of the to-be-recorded sequence numbers of the target wireless terminal is M. If a quantity of sequence numbers of the target wireless terminal that are to be recorded by the central AP is M, when the sequence number of the target wireless terminal needs to be recorded, the central AP deletes a sequence number of the target wireless terminal that is recorded earliest.

A MAC address of a wireless terminal is a unique identifier of the wireless terminal. The central AP may differentiate different wireless terminals according to MAC addresses. Regardless of in which manner the central AP records the sequence number of the target wireless terminal, the central AP may record the sequence number of the target wireless terminal according to a MAC address of the target wireless terminal when recording the sequence number of the target wireless terminal. Therefore, when searching for the recorded sequence number of the target wireless terminal, the central AP may perform indexing according to the MAC address of the target wireless terminal. If the central AP records the sequence number of the target wireless terminal in Manner 1, after receiving the first Ethernet frame, the central AP extracts the sequence number in the first Ethernet frame and a source address of the data frame corresponding to the first Ethernet frame. The central AP first determines a recorded maximum sequence number of the target wireless terminal according to the source address, and compares the sequence number extracted from the first Ethernet frame with the recorded maximum sequence number of the target wireless terminal. If the sequence number extracted from the first Ethernet frame is less than or equal to the recorded maximum sequence number of the target wireless terminal, the central AP determines that the first Ethernet frame is a duplicate Ethernet frame.

If the central AP records the sequence number of the target wireless terminal in Manner 2, after receiving the first Ethernet frame, the central AP extracts the sequence number in the first Ethernet frame and the source address of the data frame corresponding to the first Ethernet frame. The central AP first determines the recorded sequence numbers of the multiple Ethernet frames of the target wireless terminal according to the source address, and determines whether among the recorded sequence numbers of the multiple Ethernet frames of the target wireless terminal, there is a sequence number the same as the sequence number extracted from the first Ethernet frame. If among the recorded sequence numbers of the target wireless terminal, there is a sequence number the same as the sequence number in the first Ethernet frame, the first Ethernet frame is a duplicate Ethernet frame.

S214. The central AP discards the first Ethernet frame.

S215. The central AP records the sequence number according to a source address of the data frame corresponding to the first Ethernet frame.

If the central AP records the sequence number of the target wireless terminal in Manner 1, when the central AP determines that the first Ethernet frame is not a duplicate Ethernet frame, the central AP replaces the recorded sequence number of the target wireless terminal with the sequence number extracted from the first Ethernet frame.

If the central AP records the sequence number of the target wireless terminal in Manner 2, when the central AP determines that the first Ethernet frame is not a duplicate Ethernet frame, the central AP saves the sequence number extracted from the first Ethernet frame to a sequence number corresponding to the target wireless terminal.

S216. The central AP receives the second Ethernet frame.

S217. The central AP determines whether the second Ethernet frame is a duplicate Ethernet frame; if yes, step S218 is performed; otherwise, step S219 is performed.

For how the central AP determines whether the second Ethernet frame is a duplicate Ethernet frame, refer to the description in S213, and details are not further described herein.

S218. The central AP discards the second Ethernet frame.

S219. The central AP records the sequence number according to the source address of the data frame corresponding to the second Ethernet frame.

For how the central AP records the sequence number of the target wireless terminal, refer to the description in S215, and details are not further described herein.

It should be noted that the order of receiving, by the central AP, the first Ethernet frame and the second Ethernet frame is subject to an actual situation, and the order in the process is not intended to limit the present disclosure.

S220. Optionally, after receiving the data frame, the AP 2 sends a detection acknowledgement frame to the central AP.

In a process in which the target wireless terminal is handed over from the AP 1 to the AP 2, the RSSI of the target wireless terminal originally detected by the AP 2 is small, and the AP 2 cannot receive the data frame of the target wireless terminal. In a process in which the target wireless terminal gradually moves to the AP 2, the RSSI of the target wireless terminal detected by the AP 2 gradually increases. After the RSSI of the target wireless terminal reaches a given threshold, the AP 2 can receive the data frame from the target wireless terminal. This means that the target wireless terminal has been handed over from the AP 1 to the AP 2. The AP 2 sends the detection acknowledgement frame to the central AP.

It should be noted that there is no strict order between step S211 and step S220 and they may alternatively be performed at the same time.

S221. The central AP receives the detection acknowledgement frame sent by the AP 2.

If the AP 2 does not send the detection acknowledgement frame to the central AP, the corresponding step is omitted.

S222. The central AP sends a handover success notification message to the AP 1 and the AP 2.

The AP 1 and the AP 2 may have three states. A first state is starting receiving the data frame from the target wireless terminal and returning no acknowledgement frame. A second state is receiving the data frame from the target wireless terminal and returning an acknowledgement frame. A third state is stopping receiving the data frame of the target wireless terminal.

The handover success notification message sent by the central AP to the AP 1 and the AP 2 may indicate state changes of the AP 1 and the AP 2, respectively. In this step, the handover success notification message sent by the central AP to the AP 1 is used to instruct the AP 1 to switch from the second state to the third state. The handover success notification message sent by the central AP to the AP 2 is used to instruct the AP 2 to switch from the first state to the second state.

The handover success notification message sent by the central AP to the AP 1 and the AP 2 may alternatively not indicate state changes of the AP 1 and the AP 2. After receiving the handover success notification message, the AP 1 and the AP 2 automatically switch the states. Using the AP 1 as an example, if the AP 1 is in the second state when it receives the handover success notification message, the AP 1 automatically switches to the third state. If the AP 1 is in the first state when it receives the handover success notification message, the AP 1 automatically switches to the second state. The state switching of the AP 2 may be deduced by analogy. In this step, the AP 1 may switch from the second state to the third state according to the handover success notification message, and the AP 2 may switch from the first state to the second state according to the handover success notification message.

In this embodiment of the present disclosure, after the central AP receives the detection acknowledgement frame sent by the AP 2, step S222 is performed. In another possible implementation manner, step S222 may alternatively be performed after a quantity of times the central AP determines that the Ethernet frame of the target wireless terminal sent by the AP 1 or the AP 2 is a duplicate Ethernet frame reaches N, where N≥1. Alternatively, step S222 is performed after the central AP receives the detection acknowledgement frame sent by the AP 2 and the quantity of times the central AP determines that the Ethernet frame of the target wireless terminal sent by the AP 1 or the AP 2 is a duplicate Ethernet frame reaches N.

Further, after sending the handover success notification message, the central AP detects whether there is no wireless terminal handed over between distributed APs currently. If yes, after a preset time interval since a moment the handover success notification message is sent, the central AP disables a duplicate-frame detection function.

Alternatively, after a preset time interval since a moment the handover success notification message is sent, the central AP detects whether there is no wireless terminal handed over between distributed APs currently. If yes, the central AP disables a duplicate-frame detection function.

S223. The AP 1 receives the handover success notification message and stops receiving the data frame from the target wireless terminal.

The AP 1 may immediately stop returning an acknowledgement frame to the target wireless terminal, and stop receiving the data frame from the target wireless terminal after preset duration. The AP 1 may alternatively stop receiving the data frame from the target wireless terminal immediately.

S224. The AP 2 receives the handover success notification message and returns an acknowledgement frame to the target wireless terminal.

In the embodiment shown in FIG. 2, in a process in which the target wireless terminal moves from the coverage area of the AP 1 to the coverage area of the AP 2, the AP 1 first receives, in a receiving mode, the data frame from the target wireless terminal, and switches from the receiving mode to a listening mode only when receiving the handover success notification message. The AP 2 first receives, in the listening mode, the data frame from the target wireless terminal, and switches from the listening mode to the receiving mode only when receiving the handover success notification message. In a handover process, both the distributed AP before the handover and the distributed AP after the handover receive the data frame from the target wireless terminal. This ensures that no data frame sent by the target wireless terminal during the handover between the AP 1 and the AP 2 is lost, and service interruption is avoided. In addition, only one of multiple distributed APs that simultaneously receive the data frame from the target wireless terminal returns an acknowledgement frame, avoiding a collision among multiple acknowledgement frames.

Figure 4:
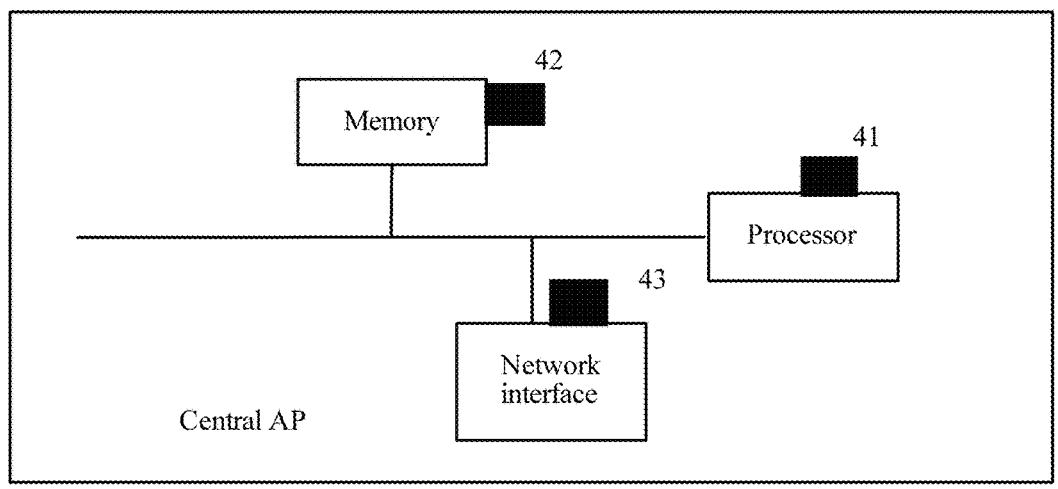
FIG. 4 is a schematic structural diagram of a central AP according to an embodiment of the present disclosure.

Referring to FIG. 4, FIG. 4 is a schematic structural diagram of a central AP according to an embodiment of the present disclosure. As shown in FIG. 4, the central AP includes a processor 41, a memory 42, and a network interface 43. The processor 41 is connected to the memory 42 and the network interface 43. For example, the processor 41 may be connected to the memory 42 and the network interface 43 using a bus.

The processor 41 is configured, so as to allow the central AP to perform corresponding functions in the foregoing method. The processor 41 may be a central processing unit (CPU), a network processor (NP), a hardware chip, or any combination thereof. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), a generic array logic (GAL), or any combination thereof.

The memory 42 is configured to store a handover condition, a sequence number of a wireless terminal, and so on. The memory 42 may include a volatile memory, such as a random access memory (RAM). The memory 42 may alternatively include a non-volatile memory, such as a read-only memory (ROM), a flash memory, a hard disk drive (HDD), or a solid-state drive (SSD). The memory 42 may alternatively include a combination of the foregoing types of memories.

The network interface 43 is configured to be connected to a distributed AP in a wired manner, to send to and receive from the distributed AP messages involved in the foregoing method.

The processor 41 may perform the following operations: making a handover decision on the wireless terminal, and when the wireless terminal meets the handover condition, determining that the wireless terminal is handed over from a first distributed AP to a second distributed AP, and sending a first instruction to the second distributed AP, where the first instruction includes an identifier of the wireless terminal, and the first instruction is used to instruct the second distributed AP to start receiving a data frame from the wireless terminal, and forbid the second distributed AP to return an acknowledgement frame to the wireless terminal; and sending a handover success notification message to the first distributed AP and the second distributed AP, where the handover success notification message includes the identifier of the wireless terminal, and the handover success notification message is used to instruct the first distributed AP to stop receiving the data frame from the wireless terminal, and is used to instruct the second distributed AP to return the acknowledgement frame to the wireless terminal.

Further, before sending the handover success notification message to the first distributed AP and the second distributed AP using the network interface 43, the processor 41 further receives, using the network interface 43, a detection acknowledgement frame sent by the second distributed AP. The detection acknowledgement frame is used to indicate that the second distributed AP is capable of receiving the data frame from the wireless terminal.

Further, before sending the handover success notification message to the first distributed AP and the second distributed AP using the network interface 43, the processor 41 further determines for the $N^{th}$ time that an Ethernet frame of the wireless terminal sent by the first distributed AP or the second distributed AP is a duplicate Ethernet frame, where $N \geq 1$.

Further, the first instruction is further used to instruct the second distributed AP to add, when converting the data frame sent by the wireless terminal into an Ethernet frame, a sequence number in the data frame to the Ethernet frame. The processor 41 may further send a second instruction to the first distributed AP using the network interface 43, where the second instruction is used to instruct the first distributed AP to add, when converting the data frame sent by the wireless terminal into an Ethernet frame, the sequence number in the data frame to the Ethernet frame; when receiving the Ethernet frame sent by the first distributed AP or the second distributed AP, extract the sequence number in the Ethernet frame and a source address of the data frame corresponding to the Ethernet frame; determine, according to the sequence number and the source address, whether the Ethernet frame is a duplicate Ethernet frame; and if the Ethernet frame is a duplicate Ethernet frame, discard the Ethernet frame; otherwise, record the sequence number according to the source address.

Further, the memory 42 records sequence numbers of multiple Ethernet frames of the wireless terminal. If among the recorded sequence numbers of the multiple Ethernet frames of the wireless terminal, there is a sequence number the same as the sequence number in the Ethernet frame, the processor 41 determines that the Ethernet frame is a duplicate Ethernet frame.

Further, the memory 42 records a maximum sequence number. If the sequence number of the Ethernet frame is less than or equal to the recorded maximum sequence number, the processor 41 determines that the Ethernet frame is a duplicate Ethernet frame. If the sequence number of the Ethernet frame is greater than the recorded maximum sequence number, the processor 41 changes the maximum sequence number to the sequence number of the Ethernet frame.

Figure 5:
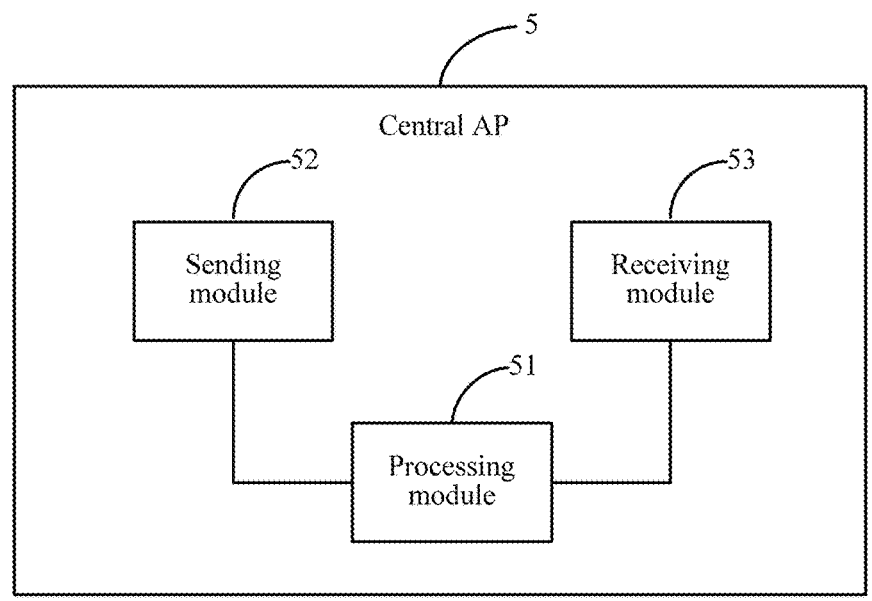
FIG. 5 is a schematic structural diagram of another central AP according to an embodiment of the present disclosure.

Referring to FIG. 5, FIG. 5 is a schematic structural diagram of another central AP according to an embodiment of the present disclosure. As shown in FIG. 5, the central AP 5 includes a processing module 51, a sending module 52, and a receiving module 53. The processing module 51 implements functions of the processor shown in FIG. 4. The sending module 52 and the receiving module 53 implement functions of the network interface shown in FIG. 4.

Figure 6:
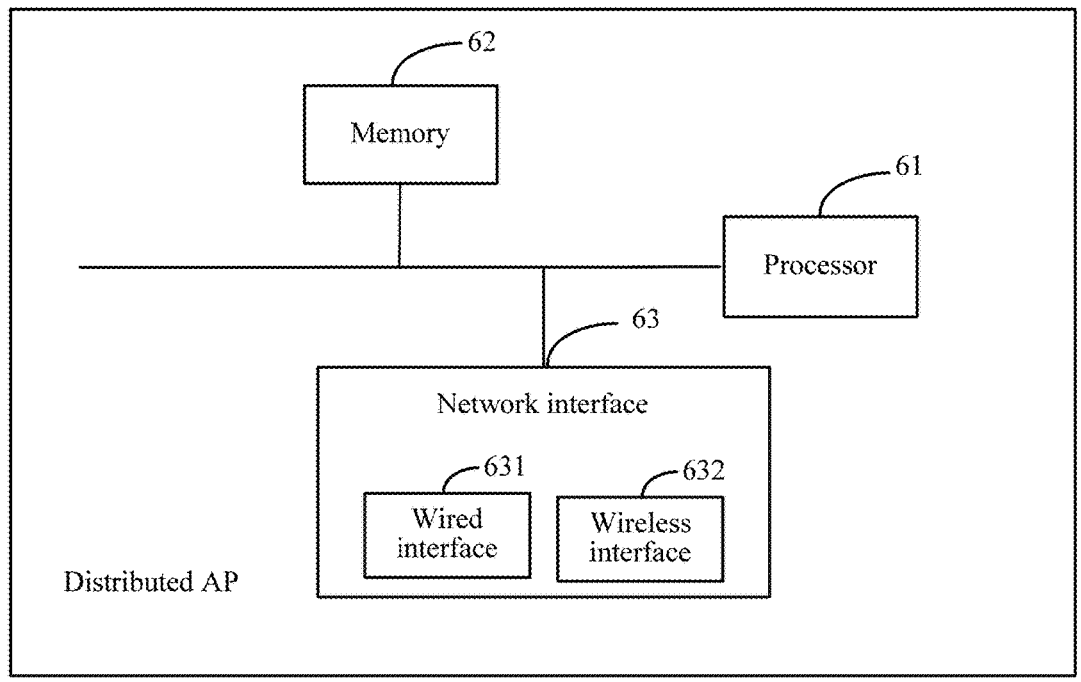
FIG. 6 is a schematic structural diagram of a distributed AP according to an embodiment of the present disclosure.

Referring to FIG. 6, FIG. 6 is a schematic structural diagram of a distributed AP according to an embodiment of the present disclosure. As shown in FIG. 6, the distributed AP includes a processor 61, a memory 62, and a network interface 63. The processor 61 is connected to the memory 62 and the network interface 63. For example, the processor 61 may be connected to the memory 62 and the network interface 63 using a bus.

The processor 61 is configured so as to perform corresponding functions in the foregoing method for the distributed AP. The processor 61 may be a CPU, an NP, a hardware chip, a radio frequency (RF) chip, a baseband chip, or any combination thereof. The foregoing hardware chip may be an ASIC, a PLD, or a combination thereof. The foregoing PLD may be a CPLD, an FPGA, a GAL, or any combination thereof.

The network interface 63 includes a wired interface 631 and a wireless interface 632. The distributed AP is connected to a central AP in a wired manner using the wired interface 631, to send to and receive from the central AP messages involved in the foregoing method. The distributed AP is in wireless communication with a wireless terminal using the wireless interface 632. The wireless interface 632 includes an antenna. The processor 61 may control the wireless interface 632 to forbid sending an acknowledgement frame for a data frame received from the wireless terminal.

The memory 62 may include a volatile memory, such as a RAM. The memory 62 may alternatively include a non-volatile memory, such as a ROM, a flash memory, an HDD, or an SSD. The memory 62 may alternatively include a combination of the foregoing types of memories.

The processor 61 may perform the following operations: receiving, using the wired interface 631, a first instruction sent by the central AP, where the first instruction includes an identifier of the wireless terminal; in response to the first instruction, starting receiving, using the wireless interface 632, the data frame from the wireless terminal, and skipping returning the acknowledgement frame to the wireless terminal; receiving, using the wired interface 631, a first handover success notification message sent by the central AP, where the first handover success notification message includes the identifier of the wireless terminal; and returning, using the wireless interface 632, the acknowledgement frame to the wireless terminal in response to the first handover success notification message.

Further, before receiving, using the wired interface 631, the first handover success notification message sent by the central AP, the processor 61 further sends a detection acknowledgement frame to the central AP using the wired interface 631. The detection acknowledgement frame is used to indicate that the distributed AP is capable of receiving the data frame from the wireless terminal.

Further, after returning, using the wireless interface 632, the acknowledgement frame to the wireless terminal in response to the first handover success notification message, the processor 61 receives, using the wired interface 631, a second handover success notification message sent by the central AP, where the second handover success notification message includes the identifier of the wireless terminal; and stops receiving the data frame from the wireless terminal in response to the second handover success notification message.

Optionally, the processor 61 immediately stops returning the acknowledgement frame to the wireless terminal, and stops receiving the data frame from the wireless terminal after preset duration.

Optionally, the processor 61 immediately stops receiving the data frame from the wireless terminal.

Further, the processor 61 converts the data frame sent by the wireless terminal into an Ethernet frame, adds a sequence number in the data frame to the Ethernet frame, and sends the Ethernet frame to the central AP using the wired interface 631.

Figure 7:
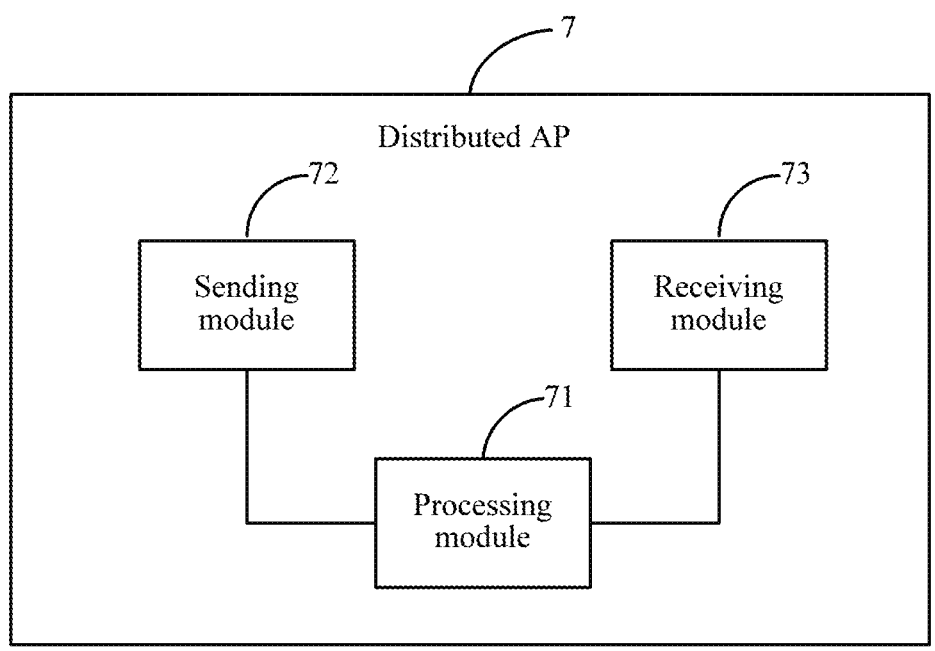
FIG. 7 is a schematic structural diagram of another distributed AP according to an embodiment of the present disclosure.

Referring to FIG. 7, FIG. 7 is a schematic structural diagram of another distributed AP according to an embodiment of the present disclosure. As shown in FIG. 7, the distributed AP 7 includes a processing module 71, a sending module 72, and a receiving module 73. The processing module 71 implements functions of the processor shown in FIG. 6. The sending module 72 implements a sending interface function of the wireless interface 632 and the wired interface 631. The receiving module 73 implements a receiving interface function of the wireless interface 632 and the wired interface 631.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disk, a ROM/RAM, and the like.

Disclosed above are merely examples of embodiments of the present disclosure, and certainly are not intended to limit the scope of the right of the present disclosure. Therefore, the protection scope of the present disclosure shall be subject to the protection scope of the claims.

What is claimed is:

1. A method for handover between distributed access points, comprising:
    making, by a central access point (AP), a handover decision on a wireless terminal;
    determining that the wireless terminal is handed over from a first distributed AP to a second distributed AP when the wireless terminal meets a handover condition,
    sending a first instruction to the second distributed AP, wherein the first instruction comprises an identifier of the wireless terminal, wherein the first instruction is used to instruct the second distributed AP to start receiving a data frame from the wireless terminal, and forbid the second distributed AP to return an acknowledgement frame to the wireless terminal; and
    sending, by the central AP, a handover success notification message to the first distributed AP and the second distributed AP,
    wherein the handover success notification message comprises the identifier of the wireless terminal,
    wherein the handover success notification message is used to instruct the first distributed AP to stop receiving the data frame from the wireless terminal, and
    wherein the handover success notification message is used to instruct the second distributed AP to return the acknowledgement frame to the wireless terminal.

2. The method according to claim 1, wherein the handover success notification message is used to immediately forbid the first distributed AP to return an acknowledgement frame to the wireless terminal, and instruct the first distributed AP to stop receiving the data frame from the wireless terminal after preset duration.

3. The method according to claim 1, wherein the handover success notification message is used to instruct the first distributed AP to immediately stop receiving the data frame from the wireless terminal.

4. The method according to claim 1, wherein before sending, by the central AP, the handover success notification message to the first distributed AP and the second distributed AP, the method further comprises receiving, by the central AP, a detection acknowledgement frame sent by the second distributed AP, and wherein the detection acknowledgement frame is used to indicate that the second distributed AP is capable of receiving the data frame from the wireless terminal.

5. The method according to claim 1, wherein before sending, by the central AP, the handover success notification message to the first distributed AP and the second distributed AP, the method further comprises determining, by the central AP for the $N^{th}$ time, that an Ethernet frame of the wireless terminal sent by the first distributed AP or the second distributed AP is a duplicate Ethernet frame, and wherein $N \geq 1$.

6. The method according to claim 1, wherein the first instruction is further used to instruct the second distributed AP to add, when converting the data frame sent by the wireless terminal into an Ethernet frame, a sequence number in the data frame to the Ethernet frame, and wherein the method further comprises:
    sending, by the central AP, a second instruction to the first distributed AP, wherein the second instruction is used to instruct the first distributed AP to add, when converting the data frame sent by the wireless terminal into an Ethernet frame, the sequence number in the data frame to the Ethernet frame;
    extracting, by the central AP, the sequence number in the Ethernet frame and a source address of the data frame corresponding to the Ethernet frame when receiving the Ethernet frame sent by the first distributed AP or the second distributed AP;

determining, by the central AP according to the sequence number and the source address, whether the Ethernet frame is a duplicate Ethernet frame;

discarding, by the central AP, the Ethernet frame when the Ethernet frame is a duplicate Ethernet frame; and recording, by the central AP, the sequence number according to the source address when the Ethernet frame is not the duplicate Ethernet frame.

7. A method for handover between distributed access points, comprising:

receiving, by a distributed access point (AP), a first instruction sent by a central AP, wherein the first instruction comprises an identifier of a wireless terminal;

starting to receive in response to the first instruction, by the distributed AP, a data frame from the wireless terminal;

skip returning an acknowledgement frame to the wireless terminal;

receiving, by the distributed AP, a first handover success notification message sent by the central AP, wherein the first handover success notification message comprises the identifier of the wireless terminal; and returning, by the distributed AP, the acknowledgement frame to the wireless terminal in response to the first handover success notification message.

8. The method according to claim 7, wherein before receiving, by the distributed AP, the first handover success notification message sent by the central AP, the method further comprises sending, by the distributed AP, a detection acknowledgement frame to the central AP, and wherein the detection acknowledgement frame is used to indicate that the distributed AP is capable of receiving the data frame from the wireless terminal.

9. The method according to claim 7, wherein after returning, by the distributed AP, the acknowledgement frame to the wireless terminal in response to the first handover success notification message, the method further comprises:

receiving, by the distributed AP, a second handover success notification message sent by the central AP, wherein the second handover success notification message comprises the identifier of the wireless terminal; and stop receiving, by the distributed AP, the data frame from the wireless terminal in response to the second handover success notification message.

10. The method according to claim 9, wherein stop receiving, by the distributed AP, the data frame from the wireless terminal comprises:

immediately stop returning, by the distributed AP, the acknowledgement frame to the wireless terminal; and stop receiving the data frame from the wireless terminal after a preset duration.

11. The method according to claim 9, wherein stop receiving, by the distributed AP, the data frame from the wireless terminal comprises immediately stop receiving, by the distributed AP, the data frame from the wireless terminal.

12. The method according to claim 7, further comprising:

converting, by the distributed AP, the data frame sent by the wireless terminal into an Ethernet frame;

adding a sequence number in the data frame to the Ethernet frame; and sending, by the distributed AP, the Ethernet frame to the central AP.

13. A central access point (AP), comprising:
a network interface; and
a processor coupled to the network interface, wherein the processor is configured to:
make a handover decision on a wireless terminal;
determine that the wireless terminal is handed over from a first distributed AP to a second distributed AP when the wireless terminal meets a handover condition;
send a first instruction to the second distributed AP using the network interface, wherein the first instruction comprises an identifier of the wireless terminal, and wherein the first instruction is used to instruct the second distributed AP to start receiving a data frame from the wireless terminal, and forbid the second distributed AP to return an acknowledgement frame to the wireless terminal; and
send a handover success notification message to the first distributed AP and the second distributed AP using the network interface,
wherein the handover success notification message comprises the identifier of the wireless terminal,
wherein the handover success notification message is used to instruct the first distributed AP to stop receiving the data frame from the wireless terminal, and
wherein the handover success notification message is used to instruct the second distributed AP to return the acknowledgement frame to the wireless terminal.

14. The central AP according to claim 13, wherein the handover success notification message is used to immediately forbid the first distributed AP to return an acknowledgement frame to the wireless terminal, and instruct the first distributed AP to stop receiving the data frame from the wireless terminal after a preset duration.

15. The central AP according to claim 13, wherein the handover success notification message is used to instruct the first distributed AP to immediately stop receiving the data frame from the wireless terminal.

16. The central AP according to claim 13, wherein the instructions further cause the processor to be configured to receive a detection acknowledgement frame sent by the second distributed AP, wherein the detection acknowledgement frame is used to indicate that the second distributed AP is capable of receiving the data frame from the wireless terminal.

17. The central AP according to claim 13, wherein the instructions further cause the processor to be configured to trigger the sending module to send a handover success notification message to the first distributed AP and the second distributed AP when the $N^{th}$ time that an Ethernet frame of the wireless terminal sent by the first distributed AP or the second distributed AP is a duplicate Ethernet frame, and wherein $N \geq 1$.

18. The central AP according to claim 13, wherein the first instruction is further used to instruct the second distributed AP to add, when converting the data frame sent by the wireless terminal into an Ethernet frame, a sequence number in the data frame to the Ethernet frame, and wherein the instructions further cause the processor to be configured to:

send a second instruction to the first distributed AP, wherein the second instruction is used to instruct the first distributed AP to add, when converting the data frame sent by the wireless terminal into an Ethernet frame, the sequence number in the data frame to the Ethernet frame;

extract the sequence number in the Ethernet frame and a source address of the data frame corresponding to the Ethernet frame when receiving the Ethernet frame sent by the first distributed AP or the second distributed AP;

determine, according to the sequence number and the source address, whether the Ethernet frame is a duplicate Ethernet frame; and discard the Ethernet frame when the Ethernet frame is a duplicate Ethernet frame; and record the sequence number according to the source address when the Ethernet frame is not the duplicate Ethernet frame.

19. A distributed access point (AP), comprising:

a network interface; and a processor coupled to the network interface, wherein the processor is configured to:

receive a first instruction sent by a central AP using the network interface, wherein the first instruction comprises an identifier of a wireless terminal;

start receiving a data frame from the wireless terminal using the network interface in response to the first instruction;

skip returning an acknowledgement frame to the wireless terminal;

receive a first handover success notification message sent by the central AP using the network interface, wherein the first handover success notification message comprises the identifier of the wireless terminal; and return the acknowledgement frame to the wireless terminal using the network interface in response to the first handover success notification message.

20. The distributed AP according to claim 19, wherein the instructions further cause the processor to be configured to send a detection acknowledgement frame to the central AP, wherein the detection acknowledgement frame is used to indicate that the distributed AP is capable of receiving the data frame from the wireless terminal.

21. The distributed AP according to claim 19, wherein instructions further cause the processor to be configured to:

receive a second handover success notification message sent by the central AP, wherein the second handover success notification message comprises the identifier of the wireless terminal; and stop receiving the data frame from the wireless terminal in response to the second handover success notification message.

22. The distributed AP according to claim 21, wherein the instructions further cause the processor to be configured to:

immediately stop returning the acknowledgement frame to the wireless terminal; and stop receiving the data frame from the wireless terminal after preset duration.

23. The distributed AP according to claim 21, wherein the instructions further cause the processor to be configured to immediately stop receiving the data frame from the wireless terminal.

24. The distributed AP according to claim 19, wherein the instructions further cause the processor to be configured to:

convert the data frame sent by the wireless terminal into an Ethernet frame;

add a sequence number in the data frame to the Ethernet frame; and send the Ethernet frame to the central AP.

* * * * *